United States Patent [19]

Dietrich et al.

[11] 4,049,311
[45] Sept. 20, 1977

[54] BULKHEAD DOOR

[75] Inventors: Alfred T. Dietrich; Gerald W. Galbreath, both of Marion, Ohio

[73] Assignee: Overhead Door Corporation, Dallas, Tex.

[21] Appl. No.: 650,464

[22] Filed: Jan. 19, 1976

[51] Int. Cl.² .................................................. B62D 33/04
[52] U.S. Cl. .................................... 296/24 R; 49/176; 105/494; 280/179 R
[58] Field of Search ............. 296/24 R; 105/486, 494, 105/497, 498, 499, 500, 502; 280/179 R; 49/176, 409, 449

[56] References Cited

U.S. PATENT DOCUMENTS

| | | | |
|---|---|---|---|
| 3,057,284 | 10/1962 | Learmont | 296/24 R |
| 3,405,661 | 10/1968 | Erickson | 105/499 |
| 3,486,468 | 12/1969 | Bezlaj | 105/497 |

Primary Examiner—Philip Goodman
Assistant Examiner—John A. Carroll
Attorney, Agent, or Firm—Blanchard, Flynn, Thiel, Boutell & Tanis

[57] ABSTRACT

A bulkhead door assembly mountable within a storage compartment, such as a refrigerated trailer, for dividing the compartment into subcompartments. Tracks are mounted on the opposed sidewalls of the compartment adjacent the upper edges thereof, and a pair of support devices are mounted on the upper corners of the bulkhead door and coact with the tracks. The support devices permit the upper edge of the bulkhead door to be fixedly latched relative to the sidewalls when the bulkhead door is in a lowered position for dividing the compartment. The support devices also hingedly support the bulkhead door to permit it to be swung upwardly about a horizontal axis located adjacent the upper edge thereof for storage in a raised position adjacent the ceiling of the compartment. A pair of releasable lock mechanisms are mounted adjacent the lower edges of the door for securing the door in either the lowered or raised position. A first actuator is associated with the lock mechanisms for permitting simultaneous manual release thereof when swinging of the door between the raised and lowered positions is desired. A second actuator is associated with the support devices to permit latches associated therewith to be simultaneously manually released so that the support devices can be moved along the tracks.

22 Claims, 7 Drawing Figures

BULKHEAD DOOR

FIELD OF THE INVENTION

This invention relates to an improved bulkhead door assembly for use with a storage structure or transporting vehicle, such as a railroad car, truck or trailer, for dividing the interior storage compartment into a plurality of subcompartments.

BACKGROUND OF THE INVENTION

Transport vehicles such as trucks, trailers and railroad cars have long utilized bulkhead doors for dividing the internal storage compartment into a plurality of subcompartments. Such doors have been particularly desirable for use in refrigerated transport vehicles, commonly called reefers, to permit the formation of several different subcompartments which can be of different temperatures to permit the simultaneous transporting of different goods within a single vehicle. While these known bulkhead doors have been widely utilized, nevertheless they have possessed features which have been less than desirable and have accordingly restricted the maximum and most efficient utilization of such doors.

For example, these known doors are structurally complex so that installation of the door within the vehicle is difficult and time consuming. Further, the mechanisms utilized for mounting the door within the vehicle are sufficiently complex as to make movement of the door, so as to adjust the position thereof, a rather complex operation. In fact, movement of the door so as to adjust the position thereof often requires the efforts of two men in order to safely handle and manipulate the door. These known doors normally utilize separate hinge and latching mechanisms disposed adjacent each upper corner of the door, with further latching mechanisms being disposed adjacent the lower corners of the door, which latching mechanisms are all independent of one another and mustbe manually manipulated, whereby adjusting the position of the door is unduly complex.

The known door structures have also encountered problems with respect to mounting the door within the vehicle, particularly a refrigerated trailer, since the transverse spacing between the side walls of a refrigerated trailer often undergoes substantial dimensional variation. The mounting mechanisms associated with the known doors have been unable to effectively compensate for this dimensional variation.

These known door structures also normally utilize several different devices for performing the individual functions of the door. For example, one set of latching devices are generally located near the lower edge of the door for locking the door in its lowered or vertical position, whereas a further set of latching devices are located adjacent the lower corners of the door for locking the door in its raised or horizontal position. The use of plural devices for performing these individual functions thus makes manipulation of the door more complex, and also increases both the cost and weight of the door.

A further disadvantage of the known doors is the difficulty experienced in attempting to replace the seals which are mounted on the edge of the door, which seals coact with the adjacent walls of the vehicle. These seals are generally fixedly attached in a manner whereby replacement of the seals is substantially impossible, or can be accomplished only by completely removing the door from the vehicle and performing substantial manual labor thereon.

Thus, it is an object of the present invention to provide an improved bulkhead door assembly which overcomes the above-mentioned disadvantages. More specifically, it is an object of the present invention to provide:

1. A bulkhead door assembly, as aforesaid, which provides a pair of combined latch and pivot mechanisms disposed adjacent the upper edge of the door for allowing the door to both pivot and lock about the same axis, with the same mechanisms preventing longitudinal movement of the door when same is in both a raised (stored) and lowered (operational) position.

2. A bulkhead door assembly, as aforesaid, wherein the upper latch mechanisms can be simultaneously manually actuated to permit movement of the door.

3. A bulkhead door assembly, as aforesaid, wherein the upper edge of the door is supported on a pair of carriage assemblies which are movable on track structures secured to the side walls of the vehicle, which carriage assemblies automatically compensate for any dimensional variation in the transverse spacing between the side walls of the vehicle.

4. A bulkhead door assembly, as aforesaid, which is provided with a pair of lock mechanisms disposed adjacent the lower corners of the door, which lock mechanisms are operational for holding the door both in its lowered position and in its raised position.

5. A bulkhead door assembly, as aforesaid, wherein the upper latch mechanisms can be released while the door is in its raised position to permit repositioning of the door.

6. A bulkhead door assembly, as aforesaid, provided with seals on all of the side edges thereof, which seals can be easily replaced without requiring a major rebuilding or repairing of the door.

7. A bulkhead door assembly, as aforesaid, wherein dual seals are provided along each edge of the door to result in an intermediate air space therebetween.

8. A bulkhead door assembly, as aforesaid, which is of light weight to facilitate its handling and manipulation while not significantly affecting the load-carrying capacity of the vehicle, which is durable and can withstand limited loads imposed thereon such as might occur when loads within the compartment undergo shifting, and which is economical to manufacture, install and manipulate.

Other objects and purposes of the invention will be apparent to persons familiar with doors of this type upon reading the following specification and inspecting the accompanying drawings.

BRIEF DESCRIPTION OF THE DRAWINGS

FIGS. 6 and 7 are enlarged, fragmentary sectional views taken along the lines VI—13 VI and VII—VII, respectively, in FIG. 2. Certain terminology will be used in the following description for convenience in reference only and will not be limiting. For example, the words "upwardly," "downwardly," "rightwardly" and "leftwardly" will refer to directions in the drawings to which reference is made. The words "inwardly" and "outwardly" will refer to directions toward and away from, respectively, the geometric center of the door assembly and designated parts thereof. Said terminology will include the words specifically mentioned, derivatives thereof and words of similar import.

SUMMARY OF THE INVENTION

The objects and purposes of the present invention, including those set forth above, have been met by providing a bulkhead door having a pair of support mechanisms mounted adjacent the upper corners of the door. These support mechanisms cooperate with the track structures which are fixed to the opposed side walls of the storage body, such as a refrigerated trailer. Each support mechanism has a carriage which is rollingly engaged with the track structure to permit the door to be moved relative to the trailer. The carriage is connected to the door by a hinge structure which permits swinging movement of the door between its raised and lowered positions. A latch mechanism is associated with each hinge structure and is adapted to lockingly engage the track structure for locking the door in either its raised or lowered position. A pair of locking mechanisms are disposed adjacent the lower corners of the door, which locking mechanisms cooperate with lock members secured to the side walls to lock the door in its lowered position. These locking mechanisms also cooperate with the track structure for holding the door in its raised position. A pair of flexible sealing strips are preferably disposed along each edge of the door for creating a sealed engagement with the walls of the trailer.

DETAILED DESCRIPTION

Figure 1:
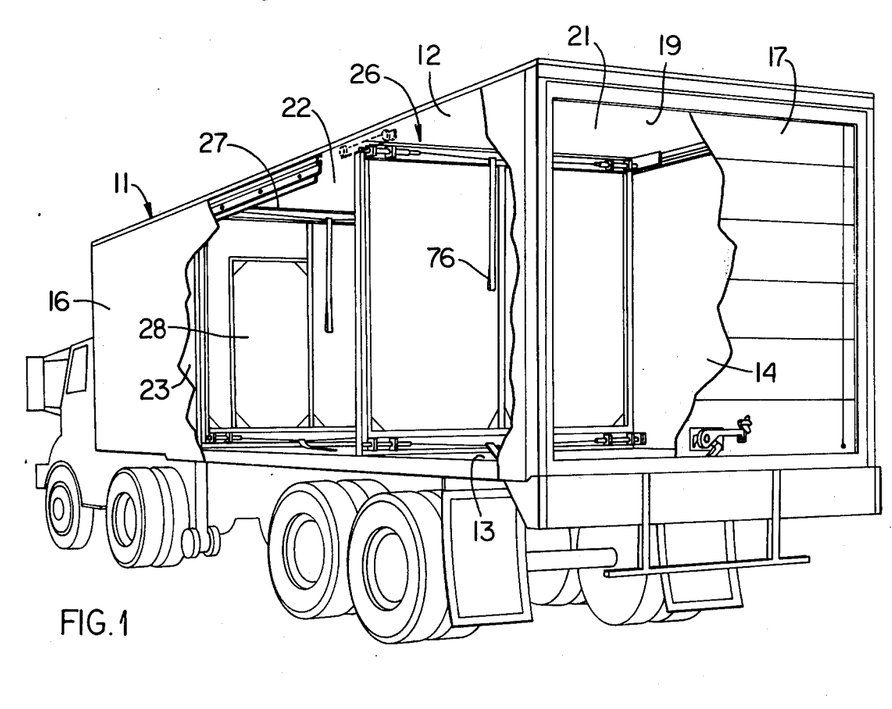
FIG. 1 is a perspective view of a truck trailer illustrating the utilization of two bulkhead doors therein.

FIG. 1 illustrates therein a cargo storage body 11 which, in the illustrated embodiment, comprises a conventional truck trailer, such as a refrigerated trailer. This trailer 11 has a wall structure which includes a top wall (roof or ceiling) 12, a bottom wall (floor) 13, opposed substantially parallel side walls 14 and 16, a front vertical wall (not shown), and a rear wall 17 which, in the illustrated embodiment, comprises a conventional openable door. These walls define a substantially closed cargo storage compartment 19 which is divided into subcompartments 21, 22 and 23 by means of bulkhead door assemblies 26 and 27. The bulkhead door assemblies 26 and 27 are identical except that the assembly 27 has a hinged pass-through door 28 associated therewith for permitting communication between the subcompartments located on opposite sides of the assembly.

Figure 2:
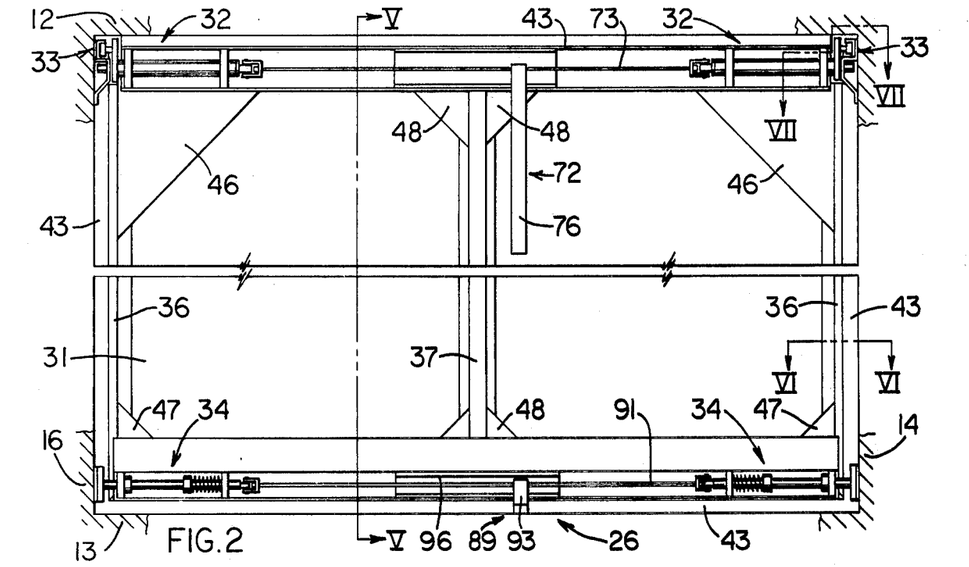
FIG. 2 is a broken elevational view of a bulkhead door assembly according to the present invention.
Figure 5:
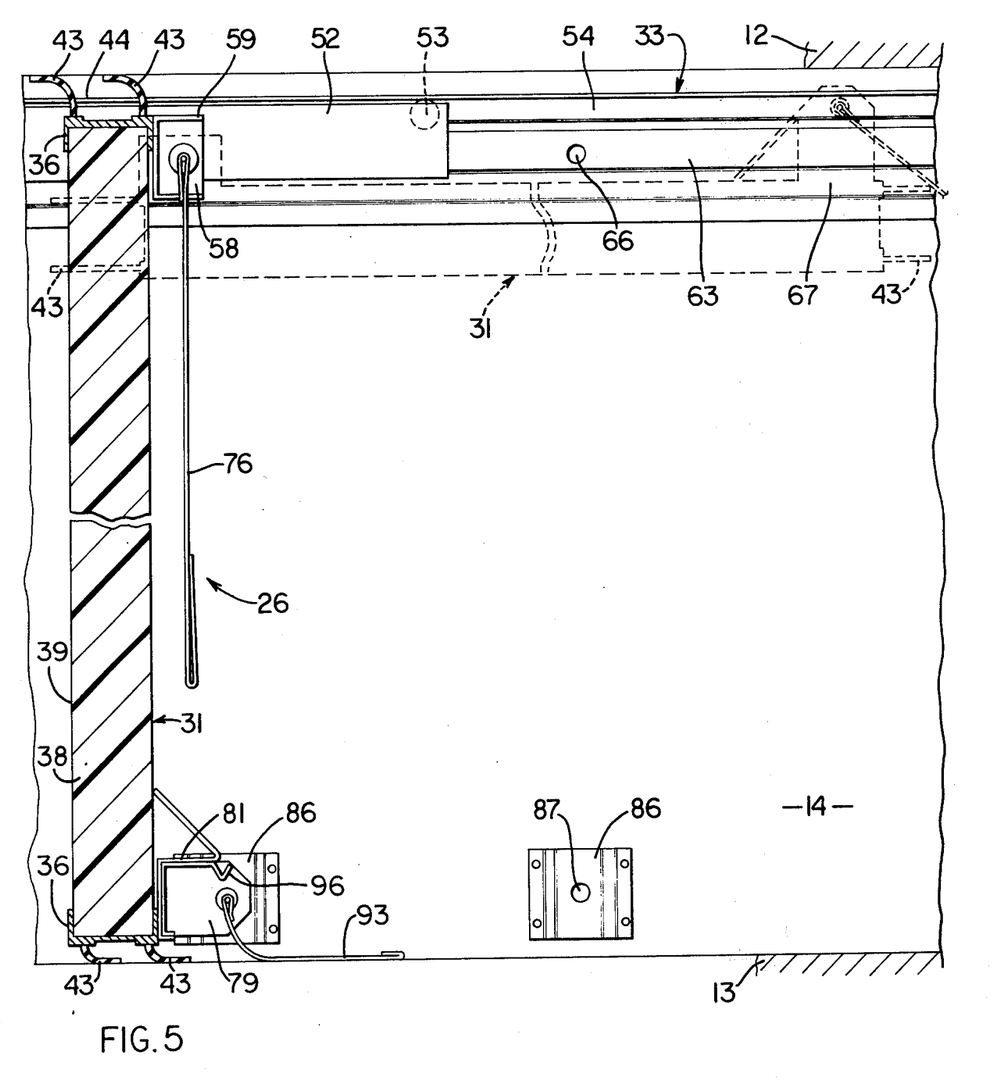
FIG. 5 is a sectional view taken along the line V—V in FIG. 2 and illustrating the door in both its lowered and raised positions.

Referring now to FIG. 2, the door assembly 26 comprises a door or panel 31 of rectangular configuration having identical support mechanisms 32 provided adjacent the upper corners thereof, which support mechanisms cooperate with track structures 33 which are fixed to the side walls 14 and 16 directly adjacent their intersection with the roof 12. The door assembly also has a pair of locking mechanisms 34 disposed adjacent the lower corners thereof for permitting the door assembly to be locked in a lowered (operational) position wherein the panel 31 is substantially vertical as shown in FIG. 5. The locking mechanisms 34 also permit the door assembly to be locked in a raised (stored) position wherein the panel 31 is substantially horizontal and positioned adjacent the roof as shown by dotted lines in FIG. 5.

Figure 6:
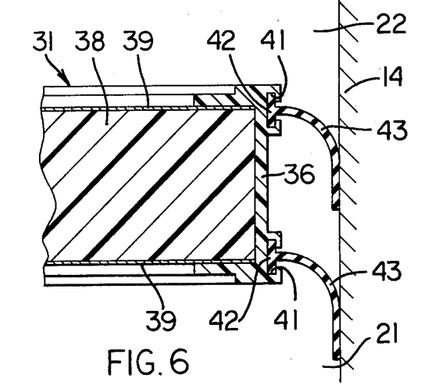
Figure 7:
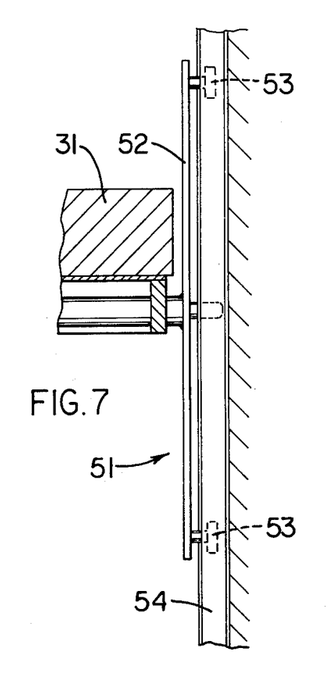

The panel 31 includes a rectangular frame formed by channel-shaped edge members 36, one of which is shown in FIG. 6. The upper and lower edge members 36 are in turn joined substantially at their midpoints by an intermediate reinforcing member 37 (FIG. 2) of substantially I-shaped cross section, which member 37 extends substantially parallel to the side edge members. The rectangular frame formed by the edge members 36 is in turn filled by a layer of thermal insulating material 38, which material preferably comprises a foamed plastic material, such as polystyrene foam. This foam layer 38 provides an effective thermal barrier while also providing substantial structural strength. The opposite sides of the foam layer 38 are in turn covered by thin facing skins 39, which skins are normally of fiberglass or aluminum.

Each of the edge members 36 has, as shown in FIG. 6, a pair of grooves 41 formed therein, which grooves 41 are disposed adjacent the opposite sides of the panel and extend longitudinally of the respective edge member throughout the length thereof. The grooves 41 receive therein an enlarged bead 42 which is formed on one end of a flexible seal 43. The pair of seals 43 as mounted on each of the edge members project outwardly from each edge of the panel and are adapted to be disposed in engagement with the adjacent wall of the trailer, such as the wall 14 illustrated in FIG. 6. The seals 43 preferably comprise a thin sheet-like elastomeric material which possesses sufficient stiffness so that the seals will project outwardly in substantially perpendicular relationship to the edge member (as shown in FIG. 5) when the seals are not engaged with an adjacent wall. However, the seals readily deflect when engaged with the wall so as to assume a sealed relationship therewith as shown in FIG. 6. The pair of spaced seals 43 create two areas of sealed engagement with the adjacent wall, whereby the subcompartments, such as the compartments 21 and 22 shown in FIG. 6, are effectively sealingly isolated from one another. The seals 43 additionally form an intermediate air space 44 therebetween which further improves the sealing of the bulkhead to the adjacent walls.

The panel 31 also has triangular gussets 46 and 47 disposed adjacent the upper and lower corners, respectively, which gussets interconnect the adjacent edge members so as to structurally reinforce the overall structure of the door. Similar gussets 48 are also provided adjacent the upper and lower edge members 36 for interconnecting same to the reinforcing I-beam 37.

Considering now the support mechanism 32, same includes a roller carriage 51 (FIG. 3) disposed for rolling engagement with the track structure 33. The carriage 51 includes an elongated carriage plate 52 which is positioned directly adjacent the track structure 33 and extends transversely on opposite sides of the panel 31. A pair of rollers 53 are mounted on opposite ends of the plate 52 and are disposed in rolling engagement with the track structure 33. For this purpose, the track structure 33 includes an elongated channel-shaped track 54 which is fixed to the respective side wall directly below the roof, which channel-shaped track 54 opens sidewardly into the storage compartment and has a lip or flange 56 formed on the lower leg thereof so as to retain the rollers 53 within the track.

Figure 3:
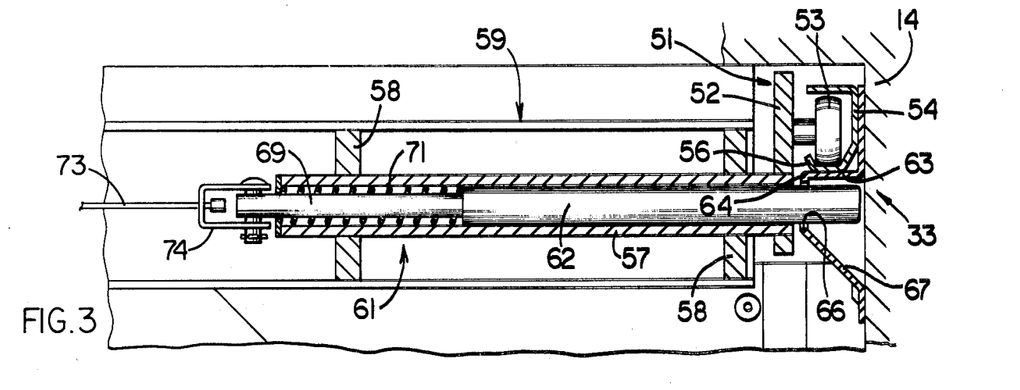
FIG. 3 is an enlarged, fragmentary sectional view of the support mechanism associated with each upper corner of the door.

The carriage plate 52 also has an elongated support sleeve 57 fixed thereto at a location which is disposed substantially midway between the rollers 53. However, the sleeve 57 is spaced slightly below the elevation of the rollers. The sleeve 57 projects inwardly from the plate 52 in substantially perpendicular relationship therewith. The sleeve 57 is rotatably supported on a pair of flanges 58 which are fixed to and extend across a channel-shaped support rail 59. The rail 59, which opens sidewardly of the panel, is in turn secured to the upper edge of the panel 31 and extends across the complete width thereof so as to cooperate with both of the support mechanisms 32. The sleeve 57 and flanges 58 thus form a pivot or hinge structure for pivotally connecting the upper edge of the door assembly to the adjacent side wall of the trailer.

To permit the upper edge of the panel 31 to be locked with respect to the track structure 33, the support mechanism 32 also has a latching mechanism 61 (FIG. 3) associated therewith. This mechanism 61 includes an elongated cylindrical latch pin 62 slidably supported within the sleeve 57 and having one end thereof adapted to project outwardly beyond the sleeve for cooperation with the track structure 33. For this purpose, the track structure 33 includes a channel-shaped locking member 63 which is disposed directly below the track member 54 and is elongated therewith. The locking member 63 is also fixedly secured to the respective side wall, such as the side wall 14, and opens toward the side wall so as to define a web or wall portion 64 having a plurality of openings 66 therethrough, which openings are uniformly spaced apart in the longitudinal direction of the locking member. Each opening 66 is of circular cross section and is slightly larger than the diameter of the latch pin 62 so as to permit this pin to readily pass therethrough and thereby lock the roller carriage 51 in a fixed position relative to the track structure 33.

The web portion 64 is spaced outwardly from the side wall, as shown in FIG. 3, to facilitate insertion of the latch pin 62 through one of the openings 66. In addition, the lower edge of the web 64 is joined to the adjacent side wall 14 by means of an intermediate wall 67 which slopes downwardly and outwardly, which wall functions as a camming surface as explained hereinafter.

The latching pin 62 terminates in a reduced diameter portion 69 which projects outwardly beyond the end of the support sleeve 57, whereupon a conventional compression spring 71 is disposed in surrounding relationship to the reduced diameter portion 69. the spring 71 coacts between the support sleeve and the latching pin for normally urging the pin 62 outwardly into a latched position as illustrated in FIG. 3.

To permit the simultaneous, yet manual, actuation of the two latching mechanisms 61 which are disposed adjacent the upper corners of the bulkhead door assembly, there is provided a manual release mechanism 72 (FIGS. 2 and 3) which includes an elongated flexible cable or element 73 extending between the latching mechanisms and having the opposite ends thereof connected to U-shaped yoke members 74. These yoke members in turn are hingedly connected to the free ends of the reduced diameter portions 69 of the latching pin 62. The manual release mechanism 72 also includes an elongated flexible strap 76 which has the upper end thereof looped around the cable 73 so that, by exerting a pulling force on the strap 76, the cable 73 can be deflected downwardly or outwardly away from the panel so as to retract the latching pins 62 inwardly in opposition to the urging of the springs 71.

Considering now the locking mechanism 34 (FIG. 4), same comprises an elongated cylindrical locking pin 78 slidably supported on a pair of spaced flanges 79, which flanges are fixed to an elongated channel-shaped rail 81. The rail 81 is fixed to the panel 31 adjacent the lower edge thereof and projects across the full width of the panel so as to cooperate with the locking mechanisms 34 which are located adjacent the opposite lower corners of the panel. The rail 81 opens sidewardly of the door in the same manner as the upper rail 59, as shown in FIG. 5.

Figure 4:
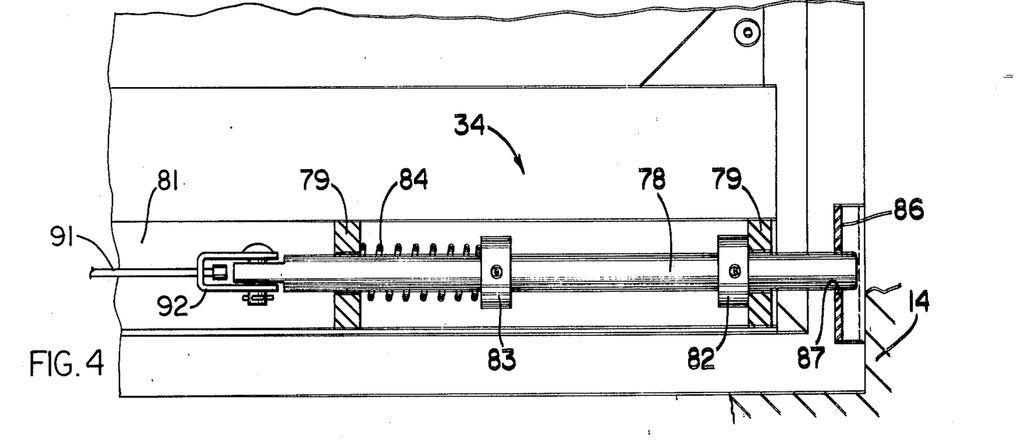
FIG. 4 is an enlarged, fragmentary sectional view of the locking mechanism associated with each lower corner of the door.

The locking pin 78 has a pair of collars 82 and 83 secured thereto, as by means of set screws, with the front collar 82 functioning as a stop and being disposed for engagement with one of the flanges 79 as shown in FIG. 4. A compression spring 84 is disposed in surrounding relationship to the locking pin 78 and is confined between the other flange 79 and the collar 83 for normally urging the locking pin 78 outwardly into a position wherein it is adaped for engagement with a locking bracket 86 which is secured to the adjacent side wall. The locking bracket 86, in the illustrated embodiment, comprises an inverted channel-like member which is fixedly secured to the side wall and has a suitable opening 87 extending through the web thereof, which opening permits the free end of the locking pin 78 to project therethrough. The opposed side walls 14 and 16 can be provided with a plurality of brackets 86 fixed thereto, which brackets 86 are spaced apart so as to be disposed substantially directly beneath the openings 66 formed in the upper locking member 63. Alternately, the individual brackets 86 can be replaced by a single elongated locking bracket which extends horizontally along the side walls and has a plurality of openings 87 therethrough disposed substantially below the openings 66.

The locking pins 78 as associated with the opposed locking mechanisms 34 are adapted to be manually, yet substantially simultaneously, released by a release mechanism 89 which includes an elongated flexible cable or element 91 having the opposite ends thereof connected to U-shaped yokes 92. These yokes 92 are pivotally connected to the free ends of the locking pins 78. An elongated flexible strap 93 has one end thereof folded around the flexible cable 91 so that a pulling force exerted on the strap 93 causes the flexible cable 91 to move outwardly away from the panel, thereby causing a simultaneous retraction of the two pins 78 in opposition to the urging of the springs 84.

The bottom rail 81 also has a handle member 96 (FIG. 5) fixedly secured thereto, which handle member is disposed substantially adjacent the center of the door so that a manual lifting force can be imposed on the door adjacent the lower edge thereof when it is desired to swingably move the door between its lowerd and raised positions.

OPERATION

The operation of the structure according to the present invention will be briefly described to insure a complete understanding thereof.

When the bulkhead door assembly 26 is in its lowered position as illustrated in FIGS. 1, 2 and 5, it divides the storage compartment 19 into subcompartments 21 and 22. The flexible seals 43 are disposed in engagement with the adjacent walls of the truck body so that the subcompartments are effectively isolated from one another, thereby permitting a substantial temperature difference to be maintained between the adjacent subcompartments. Further, the door assembly is maintained in this lower position due to the upper latch pins 62 being lockingly engaged with the channel-shaped locking member 63, simultaneous with the lower locking pins 78 being engaged with the locking brackets 86.

When it is desired to move the door assembly 26 into its raised or stored position, which position is indicated by dotted lines in FIG. 5, then the operator manually pulls on the lower strap 93 so that the flexible cable 91 is tensioned and causes the locking pins 78 to be pulled inwardly in opposition to the urging of the springs 84. The locking pins 78 are thus released from the locking brackets 86, whereupon the operator can manually grip the handle 96 and swing the door assembly upwardly about the pivot axis A defined by the latching pins 62. During the upward swinging of the door assembly, the support sleeves 57 remain stationary whereupon the support flanges 58 which are fixed relative to the door panel rotate about the support sleeves 57.

After the operator has initiated the upward swinging of the door so that the locking pins 78 have moved beyond the locking brackets 86, then the operator can release the lower strap 93, whereupon the springs 84 urge the locking pins 78 outwardly until the stop collars 82 engage the flanges 79. The operator will continue to swing the door assembly upwardly and, as the door approaches its raised position, the locking pins 78 engage the sloped walls 67 and are cammed inwardly in opposition to the urging of the spring 84. The door will continue to be swung upwardly until the locking pins 78 are aligned with the track 54, whereupon the springs 84 automatically urge the locking pins 78 outwardly so that they pass over the flange 56 and thus lock the lower edge of the door in the raised position. In this raised position, the door is thus stored in a substantially horizontal orientation and is disposed closely adjacent the roof of the truck body.

When it is desired to move the door from its raised or stored position into its lower position, then the reverse sequence of operations is performed in that the operator manually pulls on the strap 93 to release the locking pins 78 from the track 54. The operator then manually controls the downward swinging of the door and, when the door is in its lowered position, the operator again pulls on the strap 93 so as to retract the pins 78, thereby permitting the door to be swung into its vertical position wherein the locking pins are aligned with the locking brackets 86. The operator will manually release the strap 93 whereupon both locking pins 78 automatically extend and lockingly engage the respective locking brackets 86.

With the door in its raised or stored position, as shown by dotted lines in FIG. 5, the position of the door within the truck can be varied by manually pulling on the upper strap 76 so as to retract the latching pins 62. The door will thus be supported by the rollers 53 associated with the carriage plate 52, and will also be supported by the locking pins 78 which extend into the track 54. The door can then be slidably moved along the track 54 to a new location, with the latching pins 62 automatically engaging one of the holes 66 when the door reaches the new location.

The position of the door can also be adjusted when the door is in a position disposed intermediate the raised and lowered positions. In such an intermediate position, the lower edge of the door is free of connection with the trailer body, so that the door is thus supported solely by the carriages 51. By manually releasing the latching pins 62, as by pulling on the upper strap 76, the door can then be manually moved along the guide tracks 54 due to the support provided by the carriage rollers 53. Upon reaching a new position, the strap 76 is released whereupon the latching pins 62 automatically re-engage the locking member 63 upon becoming aligned with one of the openings 66.

Since the support sleeve 57 is rotatably supported on the flanges 58, this support sleeve 57 can undergo a limited amount of axial displacement relative to the flanges 58. This thus allows the carriage assembly 51 to automatically compensate for any dimensional variation with respect to the transverse spacing between the opposite side walls of the trailer body. This is of substantial importance, particularly in refrigerator trailers, since the spacing between the opposite side walls often varies by as much as ± ½ inch.

Further, the latching mechanisms 61 as provided adjacent the upper corners of the door assembly are highly desirable since they not only permit pivoting movement of the door between the raised and lowered positions, which pivoting occurs about the axis defined by the latching pins, but they also prevent longitudinal displacement of the door in both the raised and lowered positions.

The lower locking mechanisms 34 are similarly desirable since they effectively prevent longitudinal displacement of the door when in its operational or lowered position, and additionally act to hold the door in its raised or stored position. The same mechanism is thus effective in both the raised and lowered positions of the door for effectively holding same in the selected position.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a storage structure having wall means defining a storage compartment therein, said wall means including opposed top and bottom walls and a pair of opposed side walls, and a bulkhead door assembly for dividing said compartment into subcompartments, said bulkhead door assembly including panel means extending transversely across said compartment, the improvement wherein said bulkhead door assembly comprises:

a pair of track means fixedly mounted on said wall means in spaced and substantially parallel relationship;

a pair of support mechanisms mounted on said panel means adjacent one edge thereof for supporting said panel means on said track means, each said support mechanism including         a. roller carriage means disposed in rolling engagement with said track means,         b. hinge means pivotally connecting said panel means to said carriage means for permitting pivotal movement of said panel means about an axis which is disposed closely adjacent and extends substantially parallel to said one edge, and c. releasable latch means coacting between said panel means and said track means for fixedly locking said one edge of said panel means relative to said track means to prevent displacement of said carriage means along said track means;

a pair of releasable locking mechanisms mounted on said panel means adjacent a further edge thereof which is disposed opposite and substantially parallel to said one edge, said locking mechanisms including locking means movable supported on said panel means and engageable with said track means when said panel means is in a stored position wherein it is disposed closely adjacent and substantially parallel to one of said walls; and lock means fixedly associated with said wall means and engageable with said movable locking means for fixedly holding said panel means in an operational position wherein it extends transversely across said compartment and is disposed in a substantially vertical orientation.

2. A structure according to claim 1, including manual actuator means operatively interconnected to the latch means associated with said pair of support mechanisms for permitting simultaneous release of said latch means when it is desired to move said panel means along said track means.

3. A structure according to claim 2, including second manual actuator means interconnected to said pair of locking mechanisms for permitting simultaneous release thereof when it is desired to swing said panel means between said operational and stored positions.

4. A structure according to claim 1, further including manual actuator means interconnected to said pair of locking mechanisms for permitting simultaneous release thereof when it is desired to swing said panel means between said operational and stored positions.

5. A structure according to claim 1, wherein said track means includes an elongated channel-like track fixed to said wall means and opening outwardly thereof, said track means also including an elongated locking member disposed adjacent said channel-like track and fixed relative thereto, said locking member having opening means associated therewith;

said roller carriage means including a carriage member having a plurality of rollers mounted thereon, said roller being disposed in rolling engagement with said channel-like track;

said hinge means including a sleevelike pivot member rotatably supported on said panel means for rotation about said pivot axis, said sleevelike pivot member being fixedly connected to said carriage member; and said latch means including a latching pin slidably supported on and within said sleevelike pivot member, said latching pin being engageable with the opening means formed in said locking member for preventing displacement of said roller carriage means along said track, said pivot means and said latch means permitting swinging movement of said panel means about said axis even when said latching pin is engaged with said locking member.

6. A structure according to claim 5, wherein said latching pins associated with said pair of support mechanisms are aligned with said pivot axis and are disposed adjacent opposite corners of said panel means; and manually-actuated release means interconnected to said latching pins for permitting simultaneous retraction of said pins toward one another so as to release said pins from the respective locking member, whereby said roller carriage means can be rollingly displaced along said track means to reposition said panel means.

7. A structure according to claim 6, wherein each movable locking means comprises a locking member slidably supported on said panel means, the locking members being disposed adjacent corners of said panel means and disposed in substantial alignment with one another, said locking members being engageable with said lock means when said panel means is in said operational position, said locking members being engageable with said channel-like track when said panel means is in said stored position; and a manually-actuatable release device interconnected to said pair of locking members for permitting simultaneous retraction of said locking members for simultaneously releasing same from engagement with said lock means or said channel-like track.

8. A structure according to claim 6, wherein each of said latching mechanisms includes spring means associated with the latching pin for urging the latching pin outwardly into a position for engagement with the locking member, the spring means associated with the individual latching pins urging the latching pins outwardly in opposite directions, and said manually-actuated release means including an elongated flexible element extending between and connected to said latching pins so that a deflecting force imposed on said flexible element causes simultaneous retraction of said latching pins in opposition to the urging of said spring means.

9. A structure according to claim 1, including seal means fixed to each edge of said panel means and disposed for sealing engagement with an adjacent wall, said seal means including a pair of elongated flexible seal members fixed to each edge of said panel means and extending longitudinally thereof, said pair of seal members being spaced apart and each positioned for sealing engagement with one of said walls so as to create a sealed air space therebetween.

10. In a storage structure, comprising:

a body defining a walled compartment, said body including a pair of opposed and substantially parallel side walls interconnected by top and bottom walls;

partition means adapted to be disposed transversely across the compartment for dividing same into a pair of subcompartments, said partition means being substantially rectangular and having the edges thereof disposed adjacent said walls;

a guide track structure secured to each said side wall adjacent the top wall;

a carrige means movably supported on each of said truck structures;

pivot means connected between each of said carriage means and an adjacent corner of said partition means for defining a substantially horizontally extending pivot axis which is located adjacent and substantially parallel to the upper edge of said partition means, said pivot means permitting said partition means to be swingably moved between (1) an operational position wherein the partition means or oriented substantially vertically and extends transversely across the compartment and (2) a stored position wherein the partition means is oriented substantially horizontally and is disposed closely adjacent the top wall;

releasable latch means coacting between each said carriage means and the adjacent side wall for fixedly connecting said carriage means to said side wall; and releasable locking means associated with the lower edge of said partition means for fixedly locking said partition means in either said operational position or said stored position, said locking means including a pair of locking mechanisms mounted on said partition means adjacent the lower corners thereof, each locking mechanism including a movable locking member coacting with a locking structure fixedly associated with the adjacent side wall for fixedly locking said partition means to said side wall when same is in said operational position, said locking memebers also being engageable with said track structure for holding said partition means in said stored position.

11. A structure according to claim 10, wherein said releasable latch means includes a slidable latching pin disposed in alignment with and movable along said pivot axis so that said partition means can be swingably moved between said positions without releasing said latching means.

12. A structure according to claim 11, including manually actuatable release means for permitting simultaneous release of the latching pins associated with the opposite sides of said partition means.

13. A structure according to claim 12, including a manually-actuated release device interconnected to the movable locking members associated with said pair of locking mechanisms for permitting simultaneous movement of said locking members into a released position.

14. A structure according to claim 10, including a manually-actuated release device interconnected to the movable locking members for permitting simultaneous movement of said locking members into a released position.

15. A structure according to claim 10, including seal means fixedly secured to each edge of said partition means and extending longitudinally thereof, said seal means including an adjacent pair of elongated flexible sealing strips fixed to and extending longitudinally of each said edge, said pair of sealing strips each being adapted to sealingly engage the adjacent wall whereby said adjacent pair of sealing strips define an intermediate air space therebetween, said seaing strips being slidably removable from said partition means.

16. In a storage apparatus, comprising:
a body defining a walled compartment, said body including a pair of opposed and substantially parallel side walls interconnected by top and bottom walls;
partition means adapted to be disposed transversely across the compartment for dividing same into a pair of subcompartments, said partition means being substantially rectangular and having the edges thereof disposed adjacent said walls;
a guide track structure secured to each said side wall adjacent the top wall;
a carriage means movably supported on each of said track structures;
pivot means connected between each of said carriage means and an adjacent corner of said partition means for defining a substantially horizontally extending pivot axis which is located adjacent and substantially parallel to the upper edge of said partition means, said pivot means permitting said partition means to be swingably moved between (1) an operational position wherein the partition means is oriented substantially vertically and extends transversely across the compartment and (2) a stored position wherein the partition means is oriented substantially horizontally and is disposed closely adjacent the top wall; and
releasable locking means associated with the lower edge of said partition means for fixedly locking said partition means in either said operational position or said stored position, said locking means includes a pair of locking mechanisms mounted on said partition means adjacent the lower corners thereof, each locking mechanism including a movable locking member coacting with a locking structure fixedly associated with the adjacent side wall for fixedly locking said partition means to said side wall when in said operational position, said movable locking member also being engageable with said track structure for holding said partition means in said stored position.

17. An apparatus according to claim 16, wherin said guide track structure comprises a channel-like member which opens sidewardly toward the partition means and defines a roller receiving channel, said carriage means having roller means mounted thereon and rollingly disposed within said channel, and said movable locking member projecting into said channel when said partition means is in said stored position, said locking member being slidably movable along said guide track structure in the longitudinal direction of said channel whereby said partition means can be selectively slidably moved along the track structures when said partition means is in said stored position.

18. An apparatus according to claim 16, wherein said guide track structure comprises a sidewardly opening channel-like member which opens sidewardly toward said partition means and defines an elongated channel, said carriage means having a part thereof projecting into said channel for movably supporting said partition means on said track structures, said channel-like member having a sloped wall portion projecting downwardly and outwardly from said channel-like member adjacent the lower edge of said channel, and each said locking mechanism including spring means coacting with the respective movable locking member for resiliently urging same outwardly away from the partition means towards the adjacent side wall whereby said locking member is thus cammed inwardly by said sloped wall portion when said partition means is being swung upwardly toward said stored position so that said spring means then urges the locking member outwardly so as to project into said channel when said partition means reaches said stored position.

19. An apparatus according to claim 16, including releasable latch means associated with the upper edge of said partition means and coacting between said partition means and the adjacent side walls for fixedly connecting said partition means to said side walls in either said operational position or said stored position, said latch means being releasable from said side walls when said partition means is in said stored position for permitting said partition means to be slidably moved along said guide track structures while being maintained in said stored position.

20. In a storage structure having wall means defining a storage compartment therein, said wall means including opposed top and bottom walls and a pair of opposed side walls, and a bulkhead door assembly for dividing said compartment into subcompartments, said bulkhead door assembly including panel means extending transversely across said compartment, the improvement comprising:

a pair of opposed track means fixedly mounted on said side walls in spaced and substantially parallel relationship;

a pair of support mechanisms mounted on said panel means adjacent the upper corners thereof for supporting said panel means on said pair of track means, each said support mechanism including       a. roller carriage means disposed in rolling engagement with the adjacent track means, said roller carriage means including a pair of support rollers disposed in rolling engagement with the respective track means at locations spaced longitudinally therealong, said pair of support rollers being disposed for rotation about substantially parallel rotational axes which extend substantially parallel to the upper edge of said panel means, said rotational axes being disposed on opposite sides of said panel means,       b. hinge means pivotally connecting said panel means to said carriage means for permitting pivotal movement of said panel means about a pivot axis which is disposed closely adjacent and extends substantially parallel to the upper edge thereof, said pivot axis being substantially parallel to and located between the pair of rotational axes defined by said support rollers, said hinge means including a tubular hinge member which extends between and is connected to said carriage means and said panel means for defining said pivot axis, said hinge member being fixedly related with respect to one of said carraige means and panel means and being rotatably supported on the other of said carriage means and panel means, and       c. releasable latch means coacting between said panel means and said track means for fixedly locking the upper edge of said panel means relative to said track means to prevent displacement of said carriage means along said track means, said releasable latch means including a pair of releasable latch mechanisms located adjacent the upper corners of said panel means so that one of said latch mechanisms is associated with each of said track means, each said latch mechanism including a latching pin which is axially supported within said hinge member, and spring means coacting with the latching pin for resiliently urging same axially outwardly toward the adjacent side wall for urging same into latching engagement with a cooperating latch structure which is fixedly associated with the respective side wall; and     a pair of releasable locking mechanisms mounted on said panel means adjacent the opposite side edges thereof and located downwardly a substantial distance from said upper edge for fixedly locking said panel means with respect to said side walls in an operational position wherein said panel means extends transversely across said compartment and is disposed in a substantially vertical orientation.

21. An apparatus according to claim 20, including manual actuator means operatively interconnected to the latching pins associated with said pair of latching mechanisms for permitting simultaneous release thereof when it is desired to move said panel means along said track means.

22. An apparatus according to claim 20, wherein said track means comprises first and second elongated channel-shaped members which are fixedly interconnected and are disposed vertically one above the other, the first channel-shaped member opening outwardly away from the respective side wall and defining a sidewardly opening channel in which is rollingly accommodated said rollers, the second channel-shaped member opening toward its respective side wall and having a base wall which is spaced from the side wall and is provided with a plurality of openings extending therethrough, said openings being spaced apart in the longitudinal direction of the track means, the latching pin being adapted to slidably project through one of said openings.

* * * * *